United States Patent [19]

Jachmann et al.

[11] Patent Number: 4,975,894
[45] Date of Patent: Dec. 4, 1990

[54] METHOD AND APPARATUS FOR CONTROLLING DICTATION ON OR TRANSCRIPTION FROM RECORDING UNITS IN A DICTATION SYSTEM

[76] Inventors: Emil F. Jachmann, 13 High St., Greenwich, Conn. 06830; Robert L. Rubenstein, 46 Mohawk Dr., Norwalk, Conn. 06851; Joseph A. Howells, 10 Old Woods Rd., Brookfield Center, Conn. 06805

[21] Appl. No.: 145,228

[22] Filed: Jan. 19, 1988

Related U.S. Application Data

[63] Continuation of Ser. No. 771,298, Aug. 30, 1985, abandoned.

[51] Int. Cl.$^5$ .................. G11B 19/00; G11B 21/12
[52] U.S. Cl. .................................... 369/25; 360/92
[58] Field of Search ............. 379/75, 79, 77; 360/61, 360/69, 71, 92, 12, 72.1, 15, 74.1; 369/2, 24–29

[56] References Cited

U.S. PATENT DOCUMENTS

| | | | |
|---|---|---|---|
| 3,418,432 | 12/1968 | Boggs, Jr. et al. | 369/29 |
| 3,903,368 | 9/1975 | Okamura et al. | 379/79 |
| 4,588,857 | 5/1986 | Arsem | 379/77 |

*Primary Examiner*—Stuart S. Levy
*Assistant Examiner*—James E. Tomassini
*Attorney, Agent, or Firm*—Robert H. Whisker; Melvin J. Scolnick; David E. Pitchenik

[57] ABSTRACT

A dictation system having two or more recording units, each selectively operable as a dictation unit or a transcription unit, and including a selector for selecting a respective unit for recording or transcription. A unit selected for recording dictation is enabled if a record medium therein is ready, or initialized, for recording; otherwise the unit is enabled for transcription. While one unit operates to record dictation, the other may operate simultaneously to transcribe previously recorded dictation. In a system having at least three recording units, at least two are identified with respective, particular identities and the third is designated a spare recording unit. After a predetermined amount of dictation has been recorded on any one of the identified recording units, further dictation destined for that identified unit is recorded on the spare unit, and the identity of the spare unit is charged over to be equal to the identity of the recording unit for which dictation had been intended. In such a system, the original identities of the at least two recording units are established in the order in which those units are initialized, or made ready, for dictation.

24 Claims, 5 Drawing Sheets

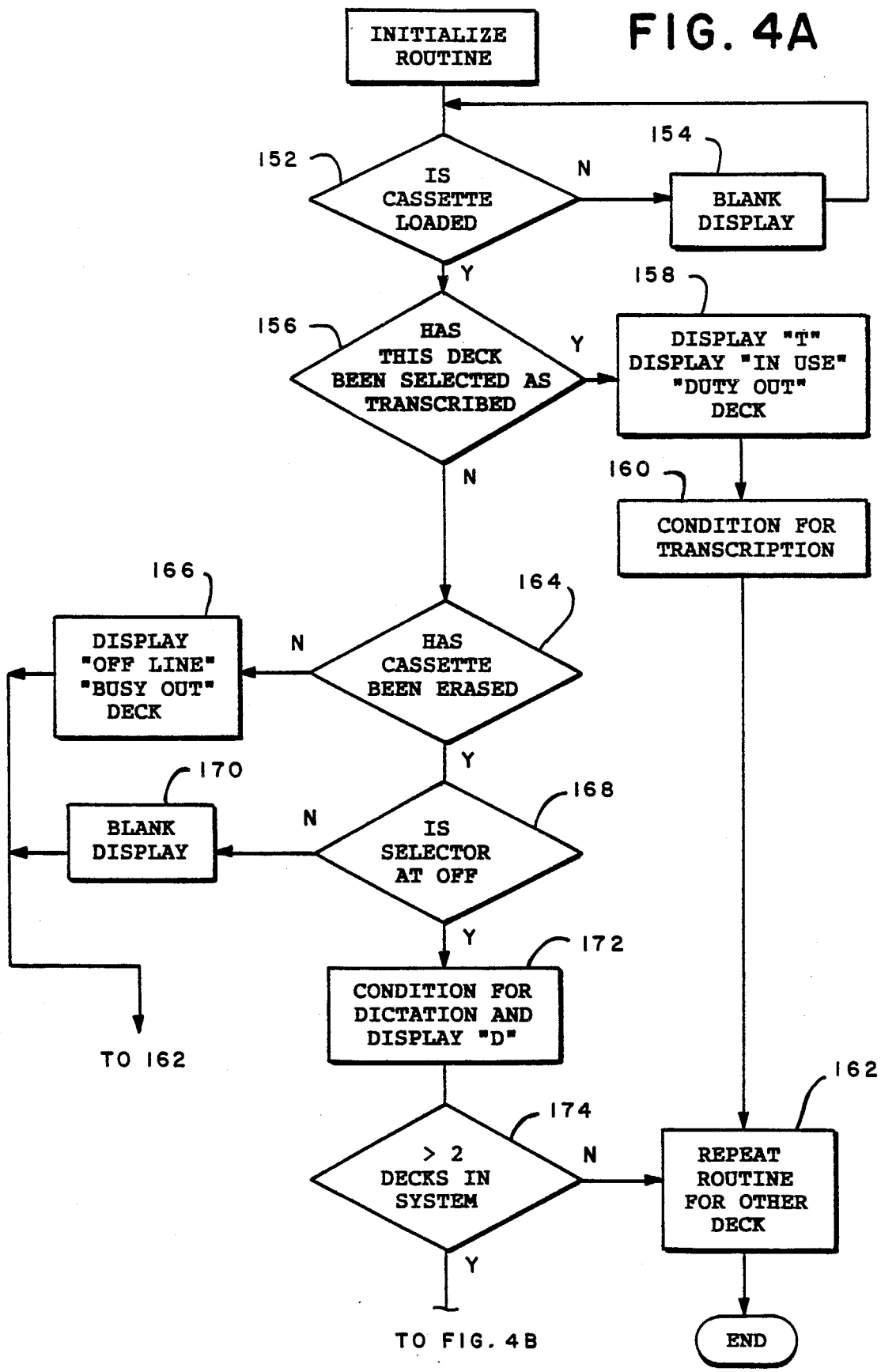

METHOD AND APPARATUS FOR CONTROLLING DICTATION ON OR TRANSCRIPTION FROM RECORDING UNITS IN A DICTATION SYSTEM

This application is a continuation of application Ser. No. 771,298, filed Aug. 30, 1985, now abandoned.

BACKGROUND OF THE INVENTION

This invention relates to dictation systems and, more particularly, to a method and apparatus for controlling the selection and operation of plural recording units that may be used for simultaneous recording and transcription of dictation or that may be used for simultaneous recording of dictation from several dictate stations.

Historically, dictation systems have been categorized as desk-top dictating machines, central dictation systems or portable dictating devices. A typical desk-top dictating machine is provided with a record medium, typically magnetic tape contained in a cartridge housing such as a standard cassette, a minicassette, a microcassette, or the recently introduced picocassette described in U.S. Pat. No. 4,443,827 and assigned to the assignee of the present invention. Connected to the desk-top dictating machine is a microphone unit having hand controls by which the user of the machine records dictation and controls movement of the record medium for the purpose of reviewing dictation or rapidly advancing the record medium to a desired location. Other conventional controls normally associated with the operation of a dictating machine also are provided.

After dictation is completed, transcription thereof requires the transfer of the record medium (or tape cassette) from the dictating machine to a transcribing machine which must be compatible with each other (e.g. they must accept the same type of record medium and operate at the same record/playback speed). Typically, the transcriptionist is provided with a head set and foot pedal switches which are connected either directly to the transcribing machine, or by so-called private wire connections, or by telephone connection.

As mentioned above, when using desk-top dictating/transcribing machines, the record medium must be removed from one machine and loaded into the other. If the respective machines are disposed at significantly spaced apart locations, such as in different offices or on different floors of an office building, this transfer of record media is a substantial inconvenience, results in inefficient office operation and may be accompanied by loss or misplacement of the record media. Even if the respective machines are located in close proximity such as in adjacent offices, the requisite transfer of record media still may result in marked reduction in office operation efficiency.

Central dictation systems as are commercially available, avoid several of the aforenoted disadvantages attendant desk-top dictating/transcribing machines. For example, in one type of central dictation system a central recorder is provided with an endless loop of magnetic tape and includes a dictate site and a separate transcribe site both of which may be operated simultaneously as described in U.S. Pat. No. 3,934,774. While such a central recorder avoids the need to transfer a record medium from a dictating machine to a transcribing machine, such central recorders generally are most efficient when used with several dictators having access to the recorder from several dictate stations. Such a central dictation system is relatively expensive and might not be cost efficient for office operation in which the system is utilized by a relatively small number of dictators and transcriptionists.

Another type of central dictation system that might be utilized more efficiently in a "small office" environment, is described in U.S. Pat. No. 4,071,857 and also in copending application Ser. No. 629,212. These systems are provided with a central recorder which operates to record dictation on individual tape cassettes, a used cassette being replaced by a fresh one to permit transcription of the used cassette and further dictation on the new cassette While such a central recorder having automatic cassette-changing capabilities reduces the amount of cassette manipulation that is attendant the aforementioned desk-top dictating/transcribing machines, there is, nonetheless, a need to load a used cassette into a separate transcribing machine to facilitate the transcription of recorded dictation.

Therefore, there is a need for an efficient dictation system that minimizes the necessity to transfer a record medium from a dictating machine to a transcribing machine, yet is capable of being accessed by several dictators in a so-called small office environment. Although prior art systems have been proposed in an attempt to address the small office environment those systems do not offer sufficient flexibility. For example one such prior art system contemplates the use of separate dictating and transcribing units mounted in side-by-side relation, with one unit being permanently designated the dictating unit and the other being permanently designated the transcribing unit. Transcription still requires the transfer of a record medium from the dictating unit to the transcribing unit. Furthermore, use of this system to record dictation simultaneously from more than one dictators on different record media, or cassettes, is difficult if not impossible.

OBJECTS OF THE INVENTION

Therefore, it is an object of the present invention to avoid the aforenoted disadvantages attending desk-top dictating/transcribing machines and central dictation systems.

Another object of this invention is to provide an efficient, inexpensive dictation system that is particularly adapted for use in a small office environment.

A further object of this invention is to provide such a dictation system in which the transfer of a record medium from a dictate unit to a transcribe unit is minimized if not obviated.

An additional object of this invention is to provide a dictation system that is relatively flexible and may be expanded to permit several dictators to dictate simultaneously on respective record media.

Yet another object of this invention is to provide a method and apparatus for controlling a dictation system of the aforementioned type in which several recording units are provided, most being designated with particular, respective identities, for selection by a dictator; and in which a spare unit subsequently is connected in place of a unit on which a predetermined amount of dictation has been recorded, the spare unit thereafter being designated with the same particular identity as the unit it replaces, thereby permitting continued dictation on a unit whose identity is desired by a dictator.

A still further object of this invention is to provide a method and apparatus for controlling the selection of plural recording units as dictation or transcription units.

It is another object of this invention to provide a method and apparatus for selecting the identities of several recording units included in a dictation system for the purpose of permitting the connection of remote dictators to a unit having selected identity.

Various other objects, advantages and features of the present invention will become readily apparent from the ensuing detailed description, and the novel features will be particularly pointed out in the appended claims.

SUMMARY OF THE INVENTION

In accordance with this invention, a dictation system is provided with at least three recording units each operable to record dictation transmitted from one of several dictate stations that may be connected thereto. Each of the at least three recording units is identified with a respective, particular identity; and any one of several dictate stations may be connected to a recording unit whose identity is selected by the dictator. When a predetermined amount of dictation has been recorded on a recording unit, the identity of a spare recording unit is changed over to be equal to the identity of the unit on which the predetermined amount of dictation has been recorded, whereby the spare unit having its newly designated identity thereafter is connected to a dictate station having dictation destined for a recording unit with that identity.

In accordance with one aspect of this invention, if dictation continues to the recording unit on which the predetermined amount of dictation has been recorded, both that unit and the spare unit are operated simultaneously for a brief period of time, and thereafter the recording unit on which the predetermined amount of dictation has been recorded is inhibited for further recording, thereby leaving the spare unit having its newly designated identity for further recording.

As a feature of this invention, if the dictator is disconnected from the recording unit on which the predetermined amount of dictation has been recorded, the disconnected recording unit is inhibited from subsequent recording; and dictation that is thereafter destined for a recording unit of the same identity is recorded on the spare unit which now has that identity.

In accordance with yet another aspect of this invention, only two recording units may be provided, each being operable as a dictation unit or as a transcription unit. Preferably, selector and function control switches are provided to enable at least basic operation of one or the other unit. When, for example, the first unit is selected for operation, the record medium therein may be initialized for dictation (e.g. previous dictation may be erased therefrom); and that unit then may be conditioned for use as a dictation unit. In the absence of such initialization and conditioning, the recording unit operates as a transcription unit.

As one feature of this aspect of the invention, first one recording unit may be initialized and conditioned for operation as a dictation unit and then the other recording unit may be similarly initialized and conditioned thus permitting both units to operate as dictation units.

As yet another feature of this invention, a simple selector switch is provided to select one or the other of the aforementioned two recording units for operation as a transcription unit. This obviates the need to transfer a record medium, such as a tape cassette, from the dictation unit to the transcription unit for the purpose of transcribing previously recorded dictation. The operational states of the respective units may be changed over by simple operation of the selector switch, thereby conditioning the unit which had been operable previously as a dictation unit now to operate as a transcription unit, and to condition the unit which had been operated previously as a transcription unit now to operate as a dictation unit. A remote dictate station is connected to the unit which now is operable as a dictation unit; and, likewise, a transcribe station (e.g. headset and foot pedal) is electrically connected to the unit which now operates as a transcription unit. No physical rewiring or interconnections are needed to effect the aforementioned connections.

As yet another feature of this invention, when three or more recording units are provided, the identities of the respective units are designated as a function of the order in which the respective units are initialized for operation as dictation units.

As a still further feature of this invention, two of the recording units are housed in stacked relation, one atop the other, in a common console. A single set of selector and function control switches is provided, these switches controlling the functions of one or the other unit, depending upon which unit has been selected for transcription and which has been selected for recording.

As a still further aspect of the present invention, both recording units in the aforementioned common console may be operated as dictation units, with dictation normally being recorded on the record medium of one unit until that medium has reached a predetermined recording capacity, whereupon further dictation is recorded on the record medium of the other unit.

BRIEF DESCRIPTION OF THE DRAWINGS

The following detailed description, given by way of example and not intended to limit the present invention solely to the embodiments described and illustrated herein, will best be understood in conjunction with the accompanying drawings in which:

FIGS. 4A and 4B is a flow diagram representing another aspect of this invention.

DETAILED DESCRIPTION OF CERTAIN PREFERRED EMBODIMENTS

Figure 1:
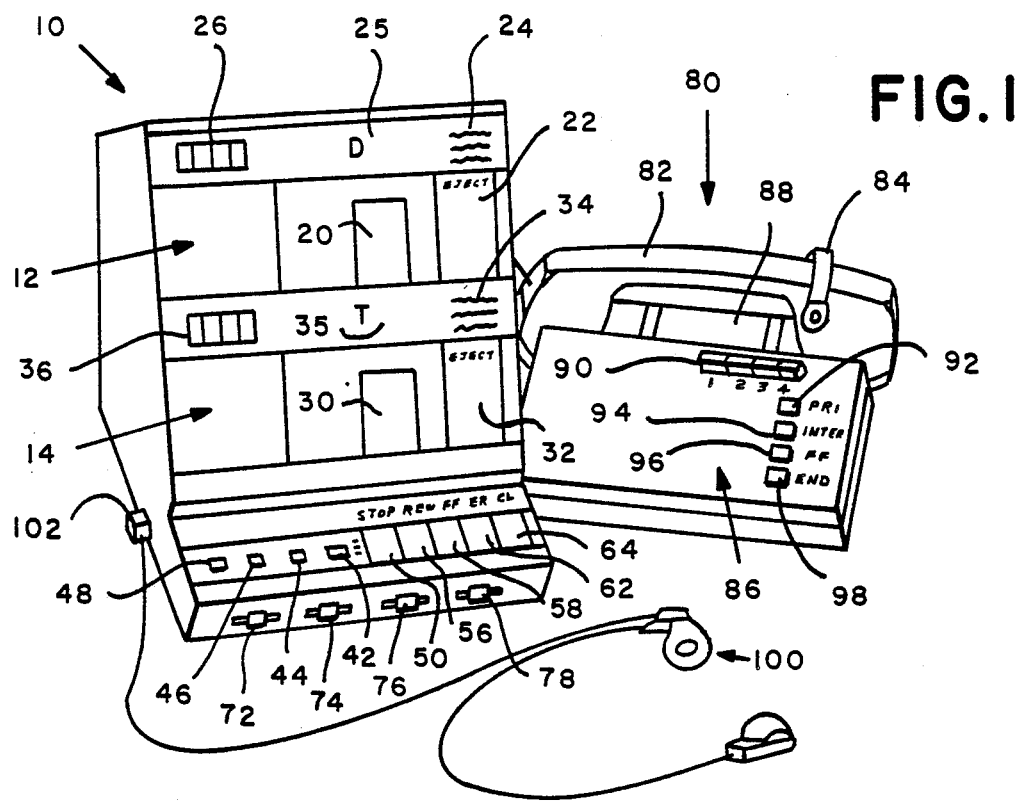
FIG. 1 is a perspective view of the dictation system in which the present invention finds ready application.

Referring now to the drawings, and in particular to FIG. 1, there is illustrated one embodiment of a dictation system 10 in which the present invention finds ready application. Dictation system 10 is comprised of two recording units 12 and 14 of substantially identical construction, these recording units being supported one atop the other in a common console or housing. Each recording unit is provided with a record/playback deck of conventional construction for the purpose of recording dictation on and playing back dictation from a record medium. Preferably, the record medium is a magnetic tape housed in a cassette, such as a standard cassette, a minicassette, a microcassette or a picocassette, all as mentioned above. In an alternative embodiment, the record medium may comprise a solid-state storage device in which dictation is stored in digital form. For convenience, and in order to simplify the present explanation, the record medium is referred to herein as a cassette or a magnetic tape; but it will be appreciated that the aforementioned solid-state digital storage device also is contemplated.

Recording unit 12 includes a cassette compartment 20 for receiving a cassette and for positioning that cassette in proper disposition with respect to forward/rewind drive elements, a record/playback head, an erase head, a capstan and a pinch roller. The cassette compartment is protected by a door that is opened in response to the manual actuation of an EJECT button 22. Recording unit 14 includes a similar cassette compartment 30 protected by a door that is opened in response to the operation of an EJECT button 32.

Recording unit 12 also is provided with an operation display 24, a mode display 25 and a numerical display 26. Likewise, recording unit 14 is provided with an operation display 34, a mode display 35 and a numerical display 36. In both recording units, the operation display 24, 34 indicates the particular operation being carried out on a cassette utilized by the recording unit. For example, the operation display may indicate when a cassette is "in use", that is, when a remote dictate station is connected to that recording unit for the purpose of recording dictation on the cassette utilized therewith. The operation display also is provided with an "end zone" indicator which is energized (or illuminated) when a predetermined amount of magnetic tape remains available for recording. For example, if a cassette is adapted to record thirty minutes of dictation, the end zone indicator is illuminated when only three minutes of tape remains available for recording. Other indications may be provided to apprise the user of the condition that the cassette on which dictation is being recorded soon will reach the end of its tape.

Operation display 24, 34 also includes an "operator" indicator which is illuminated when the attention of a supervisory operator is needed. For example, when dictation is recorded on a cassette that has been advanced to its very end, the "operator" indicator is illuminated. This indicator also may be illuminated when, for example, a cassette having a tape fault condition (e.g. the tape therein is jammed or broken) has been loaded into the recording unit, or the recording unit has been selected for transcription or for dictation but a cassette has not been loaded therein. Other conditions requiring the attention of a supervisory operator also may be indicated by the illumination of this "operator" indicator.

In the preferred embodiment, the respective indicators which comprise operation display 24, 34 may include LED's, LCD's or other visual indicators known to those of ordinary skill in the art.

Each recording unit 12, 14 also is provided with a mode display 25, 35, respectively. Each mode display may be formed of LED's, LCD's, or the like to provide visual indications of the particular mode of operation that has been selected for the respective recording unit. For example, when the recording unit has been selected for and is enabled to operate in a dictation recording mode the mode display may illuminate the letter "D" to indicate that the recording unit is enabled to record dictation. Alternatively, if the recording unit is selected to operate as a transcription unit, the mode display may illuminate the letter "T" to indicate such transcription operation. Still further, the mode display may include an "off line" indicator which is illuminated when the recording unit is in a non-operating mode in which neither dictation on nor transcription from that unit may be effected As will be described below, the mode display preferably includes identifying indicators to identify the recording unit as unit "1", "2" or "3" in a multi-unit recording system.

Recording units 12 and 14 also are provided with numerical displays 26 and 36, respectively. Each numerical display is formed of a four digit LED or LCD display (or the like) which indicates the length of dictation that has been recorded on or transcribed from a cassette. This indication may be illustrated in minutes and tenths of minutes, wherein, for example, a display of "035" represents three minutes and thirty seconds of dictation. When the recording unit is operated as a transcription unit, the numerical display indicates the approximate number of lines of typewritten material that await transcription in a particular message, letter, or the like. The numerical display also may display, as a first digit, the letter "P" which indicates the recording of a priority message. A message of superior importance which should be transcribed quickly is indicated by this prefix "P". This prefix "P" may be displayed alternately with a numeral which represents the number of priority messages remaining for transcription on the tape. The remaining three digits represent the approximate number of typewritten lines in the message awaiting transcription. As will be explained below, a "priority" message is represented by a special prefix code that is recorded on the tape itself, this code being sensed by the record/transcribe electronics included in dictation system 10.

Dictation system 10, as illustrated in FIG. 1, is provided with a single keyboard that may be operated either in conjunction with recording unit 12 or in conjunction with recording unit 14. A unit selector switch 42 is provided for selecting the desired recording unit to be operated. For example, when selector switch 42 is disposed in its first condition, that is, when the selector switch is moved to its upper position, recording unit 12 is selected for operation. The recording deck included in recording unit 12 then may be operated as a function of the operation of function control switches 50, 56, 58, 62 and 64, as will be described. Conversely, when unit selector switch 42 is disposed in its second condition, that is, when the selector switch is moved to its lowermost position, recording unit 14 is enabled for operation in response to the actuation of the aforementioned function control switches Unit selector switch 42 preferably includes a third condition, corresponding to its center position, which is used to select recording unit 12 or recording unit 14 or both for operation as a dictation unit. More particularly, and as described below with respect to FIG. 4 if, the unit selector switch is operated from its first condition to its third condition, recording unit 12 is selected for operation as a dictation unit, provided that other initializing parameters are established, as will be described. If the unit selector switch is operated from its second condition to its third condition, recording unit 14 is selected for operation as a dictation unit, provided the aforementioned initializing parameters have been established.

Dictation system 10 also includes a remote/local selector switch 44 which is adapted to connect matching impedances within the dictation system to be compatible with transcribe apparatus that is connected directly to the dictation system or with transcribe apparatus that is disposed at a remote location and that is connected to the dictation system via telephone lines, private wire lines, or the like.

A cassette speed selector switch 46 also is provided, this switch being selectively operable by the user of dictation system 10 to select the appropriate record/playback speed of the magnetic tape upon which dictation is recorded and played back. Typically, the magnetic tape is advanced at a speed of approximately 2.4 cm per second in a microcassette upon which thirty minutes of dictation may be recorded Alternatively, and for extended play, the record/playback speed may be established at approximately 1.2 cm per second, resulting in a capacity of sixty minutes of dictation. Cassette speed selector switch 46 is operable to select the lower or higher cassette speed, depending upon whether extended capacity is desired. It has been found, generally, that the fidelity of recorded dictation is somewhat reduced when the cassette is operated at its slower speed.

Dictation system 10 also is provided with speaker/headset selector switch 48. Although not shown and described and described in detail herein, it will be appreciated that dictation system 10 includes an integral speaker which may be connected, via suitable electronics, to the playback head of recording unit 12 or recording unit 14, depending upon whether unit selector switch 42 is disposed in its first or second condition, respectively. Reproduced audio sounds are played back via this integral speaker when speaker/headset selector switch 48 is operated to select the integral speaker for reproducing such sounds. The dictation system also includes a suitable socket to which a headset 100 is connected by means of a jack 102, and this headset is connected, via suitable electronics, to the playback head of recording unit 12 or recording unit 14 in the event that speaker/headset selector switch 48 has been operated to select the headset for the reproduction of audible sounds.

The function control switches included in dictation system 10 include a STOP switch 50. This switch is manually operable to establish a "stop", or quiescent, mode of operation for the dictation system. Typically, switch 50 may be operated to terminate a fast-forward or rewind mode of operation which, in turn, may be selected by the operation of REWIND switch 56 or FAST-FORWARD switch 58. The STOP switch also is operable to quiet an audible warning sound or alarm that may sound at dictation system 10.

REWIND switch 56 is adapted, when operated, to select a rewind operating mode for recording unit 12 or recording unit 14, depending upon whether unit selector switch 42 exhibits its first or second condition, as mentioned above. Likewise, the actuation of FAST-FORWARD switch 58 selects a fast forward mode of operation for the selected recording unit. When a recording unit is selected for operation as a transcription unit, the actuation of REWIND switch 56 functions to rewind the magnetic tape while scanning that tape for the occurrence of signals representing the ends of messages that had been dictated. Dictation system 10 includes one or more microprocessors which, when supplied with so-called "chopper pulses" that are generated as the magnetic tape is moved, responds to the occurrence of the end-of-message signals to determine the location and length of each message Depending upon whether recording unit 12 or recording unit 14 has been selected as a transcription unit, numerical display 26 or 36 indicates the length of the particular message then in position for transcription.

When FAST-FORWARD switch 58 is actuated, the magnetic tape provided in the recording unit which has been selected as a transcription unit is "searched" for access to "priority" messages. When a priority message is encountered, as when a recorded priority code is detected tape movement stops and playback of that message begins within a predetermined time (e.g. a few seconds). If no "priority" messages had been recorded on the tape, the first message which had been recorded will be played back. Preferably, FAST-FORWARD switch 58 is actuated after the magnetic tape has been fully rewound and scanned). The operation of FAST-FORWARD switch serves to rapidly advance the magnetic tape in the forward direction until the first "priority" message is reached. If no "priority" codes had been detected during the rewind operation, the actuation of FAST-FORWARD switch 58 serves merely to initiate the playback of the first message that had been recorded.

ERASE switch 62, when actuated simultaneously with the actuation of REWIND switch 56, serves to energize the erase head included in recording unit 12 (or recording unit 14, depending upon the condition of unit selector switch 42) to erase dictation which had been recorded previously on the magnetic tape in that unit. For enabling a desired recording unit to operate as a dictation unit such "erasure" operation (i.e. the simultaneous operation of REWIND switch 56 and ERASE switch 62) serves to initialize the recording unit. In the absence of such initialization of the recording unit, that unit is inhibited from operating as a dictation unit.

A CLEAR switch 64 is provided for the purpose of erasing information stored in the display memory of dictation system 10. Such information may represent the locations of previously recorded messages, the lengths of such messages, the location of "priority" messages, and the like. The CLEAR switch should be actuated prior to transcribing a newly-loaded cassette, and this switch also should be actuated before a selected one of these recording units is conditioned as a dictation unit. In this manner, information that had been derived from a previously recorded or transcribed cassette is cleared from the display memory and does not interfere with the display of new information derived from the cassette then being utilized.

Dictation system 10 also is provided with additional controls 72, 74, 76 and 78. These controls are designated volume control 72, tone control 74, playback speed control 76 and backspace control 78. Each control is constructed as a slide switch and, in one embodiment, each such switch produces an analog voltage that is used to control, or establish, a desired volume, tone, playback speed or backspace, respectively. Alternatively, each slide switch may produce a discrete digital signal, depending upon its position, to establish a respective volume, tone, playback speed or backspace level. Thus, the magnitude of the audible sounds which are reproduced by the integral speaker of dictation system 10 or by headset 100 is adjusted by the setting of volume control 72. Likewise, the tone of the reproduced audible sounds (i.e. the relative treble and base level thereof) is established by the setting of tone control 74. The speed at which the tape is moved during a transcription operation, that is, the incremental difference between the speed selected by cassette speed selector switch 46 and the actual playback speed, is set and adjusted by playback speed control 76. Finally, the incremental amount of backspace that is produced when, for example, a playback switch is released during transcription, is set and adjusted by means of backspace control 78.

In addition to headset 100, a conventional foot pedal switch is connected to dictation system 10 for the purpose of controlling recording unit 12 or recording unit 14, depending upon the condition of unit selector switch 42, for a transcription operation. Typically, the foot pedal switch includes a playback pedal, a rewind pedal and a fast-forward pedal, the selected operation of which initiates a corresponding operation of the selected recording unit. When the playback pedal is actuated, the release thereof effects a brief rewinding of the tape by an amount determined by the setting of backspace control 78. Consequently, upon the reactuation of the playback pedal, the last few words which had been played back previously are played back once again.

Dictation system 10 is connected by means of private wire connections or by means of telephone connections to one or more dictate stations 80. A suitable switch control (not shown) may be provided to interconnect dictation system 10 with several dictate stations, the switch serving to permit only one dictate station to be connected to recording unit 12 or to recording unit 14, depending upon which of these recording units had been selected as the dictation unit. Dictate station 80 is provided with a handset 82, similar to a conventional telephone handset to the extent that a microphone is provided at one end thereof and a speaker is provided at the other end to permit dictation to be transmitted to dictation system 10 and to permit dictation to be audibly reproduced for review by the dictator. Handset 82 includes a dictate control switch 84, as is conventional in telephone-type dictate stations, this dictate control switch being operable to initiate a "record" mode and a review/play mode. Since the operation of dictate control switch 84 is conventional, further description thereof is not provided.

Figure 2:
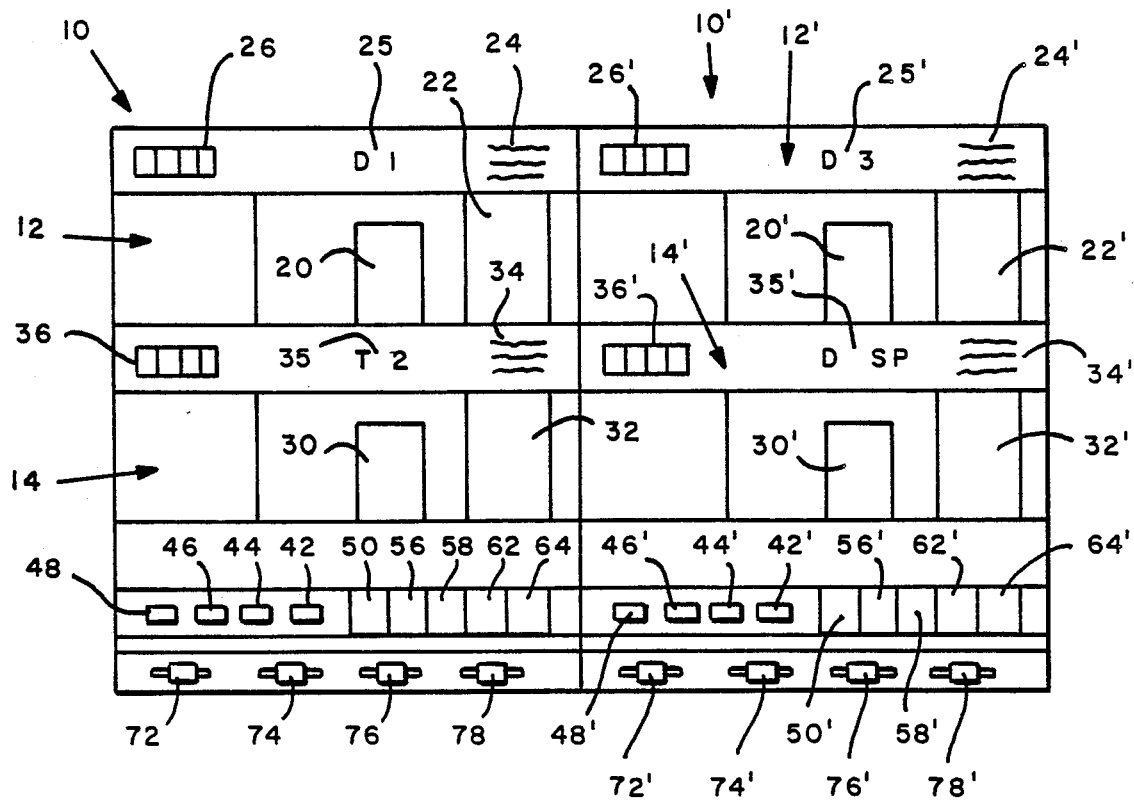
FIG. 2 is a front view of the dictation system which is particularly adapted for use in a small office environment and in which the present invention may be utilized.

Dictate station 80 also is provided with a desk set 86 having a cradle 88 to receive handset 82. Preferably, cradle 88 includes a switch similar to a conventional telephone hook switch which indicates when handset 82 is "off-hook" or "on-hook". Desk set 86 also includes a unit selector switch 90 formed of, for example, four separate pushbutton switches 90-1, 90-2, 90-3 and 90-4. Each pushbutton switch, when actuated, and subject to the availability of a recording unit, connects dictate station 80 to a recording unit associated with a respective one of the pushbutton switches. In the embodiment wherein dictation system 10 is provided with only two recording units, pushbutton switches 90-1 and 90-2 select recording unit 12 or recording unit 14, respectively, for connection to dictate station 80. If a selected recording unit is "in use", that is, if that recording unit has been selected for operation as a transcription unit or if that recording unit already is connected to another dictate station, or if the selected recording unit is "off line", the operation of the unit selector switch is ineffective to establish a connection between dictate station 80 and the selected recording unit. Preferably, an "in use" indicator is provided with each unit selector switch to indicate to the user of dictate station 80 which recording units are "in use", as aforementioned Dictate station 80 may be used in conjunction with a dictation system having four recording units, such as represented in FIG. 2, and for this reason unit selector switch 90 is provided with four pushbutton switches to permit the dictate station to be connected to any one of such four recording units. Those recording units which are in use are indicated by respective "in use" visual indicators associated with respective ones of pushbutton switches 90-1, 90-2, 90-3 and 90-4.

In the embodiment wherein only two recording units are provided, as illustrated in FIG. 1, unit selector switch 90 may be omitted or, alternatively, may have no effect upon the particular recording unit that is connected to dictate station 80 when handset 82 goes "off-hook". That is, suitable dictation system controls are provided to connect the dictate station only to the one recording unit which has been selected for operation as the dictation unit, provided that dictation unit is not already in use. In the embodiment shown in FIG. 1, if both recording units 12 and 14 are selected as dictation units, unit selector switch 90-1 may be operated to connect dictate station 80 to recording unit 12 and unit selector switch 90-2 may be operated to connect dictate station 80 to recording unit 14, provided such recording units are not then "in use".

Desk set 86 also is provided with switches 92, 94, 96 and 98 which are adapted to be manually actuated to initiate the functions now to be described. PRIORITY switch 92, when actuated, serves to record the aforementioned priority code on the magnetic tape included in the recording unit to which dictate station 80 is connected. As an example, the priority code may comprise a predetermined number of bursts (e g. two bursts) of a tone signal which, when detected, is identified as the beginning of a "priority" message.

INTERCOM switch 94, when actuated, serves to establish a simple communication connection between handset 82 and similar communication apparatus (e.g. a similar handset) located at the site of dictation system 10. The dictator thus may communicate directly with the transcriptionist or a supervisory operator at that site.

FAST-FORWARD switch 96, where actuated, initiates a fast forward operation of the magnetic tape in the recording unit to which dictate station 80 is connected. The tape is driven in the fast-forward mode until the so-called "farthest advance" point (i.e. the point reached by a dictator prior to rewinding the tape) is reached.

END switch 98, when actuated, serves to record a predetermined tone signal on the magnetic tape. It is expected that END switch 98 will be actuated upon the completion of a message; such as a letter, and thus functions to record an end-of-message tone signal on the magnetic tape. This end-of-message tone signal is distinguished from a so-called "secrecy" tone signal that is recorded when handset 82 is returned to cradle 88 (i.e. it is placed in its "on-hook" condition) to disconnect dictate station 80 from dictation system 10. The recording of such a "secrecy" code is conventional in central dictation systems and serves to signify the completion of dictation by a dictator and prevents a subsequent dictator from effecting a rewind operation of the magnetic tape to access the message that had been recorded by the previous dictator. Such a "secrecy" code normally is recorded at the end of the last-dictated message and, hence, is analogous to the aforementioned end-of-message tone signal. However, the end-of-message tone signal, when detected, does not prevent the magnetic tape from being rewound further; and, thus, the detection of the end-of-message tone signal does not prevent the present dictator from reviewing his own previously recorded messages.

The manner in which dictation system 10 operates to designate one or the other recording unit as a dictation unit, or to designate both recording units as dictation units, or to designate only one of the recording units as a transcription unit will be described below in conjunction with the flow diagram illustrated in FIG. 4. It is appreciated that dictation system 10 is provided with one or more microprocessors which sense the operation of various ones of the selector and function control switches to control the operation of the dictation system. Such microprocessors also detect the operation of dictate station 80 to effect a connection between the dictate station and a recording unit and control the operation of the accessed recording unit for the recording of dictation thereon. Before describing such microprocessor control, reference is made to FIG. 2 in which two dictation systems 10 and 10' are illustrated, these two dictation systems being electrically interconnected (not shown) as well as being physically joined in side-by-side relation.

It will be appreciated that dictation systems 10 and 10' are substantially identical; and the respective component parts which comprise dictation system 10' are identified with primed reference numerals that have been used to identify like component parts of dictation system 10. In the interest of brevity, further duplicative description of dictation system 10' is not provided.

When using dictation systems 10 and 10' in the configuration illustrated in FIG. 2, each recording unit 12, 14, 12' and 14' may be designated with a particular identity. For example, recording unit 12 may be identified as the recording unit upon which brief letters are dictated. Any dictator may select recording unit 12 for the recording of such brief letters by operating, for example, unit selector switch 90-1 of his desk set 86 provided in dictate station 80. If recording unit 12 is enabled to operate as a dictation unit, and if this recording unit is not otherwise connected to another dictate station, a dictator may connect his dictate station 80 to recording unit 12 by lifting handset 82 from cradle 88 and by actuating unit selector switch 90-1.

Similarly, recording unit 14 may be identified as the recording unit upon which only priority messages are recorded. If this recording unit is not otherwise connected to a dictate station, any dictator in the overall system may connect his dictate station 80 to recording unit 14 for the purpose of recording priority messages. In a similar manner, recording unit 12' may be identified as the recording unit by which notes or memos or legal briefs (or any other particular type of message) are recorded. The remaining recording unit 14' preferably is identified as a "spare" unit whose identity assumes (i.e. is made equal to) the identity of recording unit 12, 14 or 12' whose cassette has just been advanced into its end zone. That is, the identity of the first recording unit 12, 14 or 12' which first reaches a predetermined recording capacity is transferred to recording unit 14'; and recording unit 14' then operates with its newly designated identity to record subsequent dictation destined for a unit having that identity. Once the cassette in the recording unit which has reached its predetermined recording capacity is transcribed (e.g. by selecting that recording unit for operation as a transcription unit by operating unit selector switch 42 or which, when supplied with so-called 'chopper pulses' that 42'), that recording unit then may be designated the "spare" unit. Alternatively, if the cassette is removed from that recording unit for transcription by another machine (not shown), that recording unit is designated the "spare" unit when a fresh cassette is loaded therein and is initialized for dictation.

The manner in which the identities of the respective recording units are assigned will be described below in conjunction with the flow chart shown in FIG. 4. Suffice it to say that ii recording unit 12 is identified as unit "1", recording unit 14 is identified as unit "2" and recording unit 12' is identified as unit "3", then recording unit 14', if enabled for dictation, is identified as the "spare" unit. If the predetermined recording capacity first is reached by unit "1", then the identity of the "spare" unit is changed over to unit "1" and previously identified unit "1" is rendered "off line" for further dictation. Once the cassette in previously identified unit "1" is transcribed, or if a new cassette is loaded therein this unit thereafter is identified as the "spare" unit. Conversely, if the predetermined recording capacity first is reached by unit "2", the identity of the "spare" unit is changed over to unit "2" and previously identified unit "2" is rendered "off line". Thus, it is seen that any of the illustrated recording units may adopt any of the aforementioned identities "1", "2", "3" or "spare"; and as dictation progresses, the changing over of identities, as mentioned above, likewise will continue. The particular identity of a recording unit may be viewed as merely temporary; and the actual identity thereof may change between "spare" and any of identities "1", "2" and "3". Hence, a dictate station that is connected to unit "1" may be connected to any one of the recording units illustrated in FIG. 2. That is, the actuation of unit selector switch 90-1 will connect dictate station 80 to the recording unit then identified as unit "1", this identity being changed from one of the illustrated recording units to another from time to time.

It will be appreciated that any three of the illustrated recording units, that is, those units identified as units "1", "2" and "3", may be connected simultaneously to three different dictate stations for the simultaneous recording of dictation thereon. If a dictate station remains connected to a recording unit after a predetermined amount of dictation has been recorded (i.e. when the tape included in that recording unit has been advanced to its "end" zone), the dictate station will be connected simultaneously to that recording unit as well as to the "spare" unit. If dictation continues, such continued dictation will be recorded simultaneously on both units for a brief interval of time. Thereafter, the recording unit in which the predetermined amount of dictation has been recorded will be disconnected from the dictate station, leaving only the newly identified (but previously identified "spare" unit) connected to that dictate station. The previously identified, but now disconnected, recording unit remains in an "off line" mode until the cassette therein is transcribed or until a fresh cassette is loaded and initialized. Thus, the previously identified recording unit is inhibited from operating as a dictation unit until it is initialized, as mentioned above.

In the absence of a "spare" unit, the aforedescribed overlapping, or extension of dictation, on two units simultaneously is inhibited. Rather, the recording unit having the predetermined amount of dictation recorded thereon merely is disconnected from the dictate station and rendered "off line" a predetermined time after the "end zone" of its cassette has been reached. If a "spare" unit is provided in the overall dictation system, and if the predetermined amount of dictation is recorded on unit "1" or "2" or "3", that particular identity is transferred to the "spare" unit if the dictate station is disconnected from that unit. That is, simultaneous recording on the newly identified "spare unit" and the previously identified unit will not occur if the previously identified unit is disconnected from the dictator. Nevertheless, once disconnected, the previously identified unit is inhibited from recording further dictation until the cassette therein has been transcribed or replaced.

Although the embodiment illustrated in FIG. 2 is comprised of four recording units, the present invention is equally applicable to, for example, three recording units (identified as units "1", "2" and "spare") and also to a system in which six or eight recording units are provided. Furthermore, it will be appreciated that, if desired, the "spare" unit in a 4-unit configuration may be selected as a transcription unit, thus preventing that unit from recording dictation and from assuming the same identity as that of a recording unit upon which a predetermined amount of dictation has been recorded.

As will be explained below, the identities "1", "2", "3" and "spare" may be assigned to any of the respective recording units 12, 14, 12' and 14', depending upon the order in which the units are initialized. For example, if recording unit 14 is initialized first (i.e. if the cassette therein is the first to be erased), it is designated unit "1". If recording unit 12' is the next to be initialized, it is designated unit "2". If recording unit 12 is the third recording unit to be initialized, it is designated unit "3". Finally, when recording unit 14' is initialized, it is designated the "spare" unit.

The manner in which the identity of a recording unit is transferred to a "spare" unit once a predetermined amount of dictation has been recorded now will be described in conjunction with the microprocessor flow diagram illustrated in FIG. 3. It will be appreciated that this flow diagram represents one of several routines that may be carried out by the microprocessor. This microprocessor may be included in dictation system 10 or in dictation system 10' and is capable of executing other routines and subroutines, one of such additional routines being described below and the others forming no part of the present invention per se.

Figure 3A:
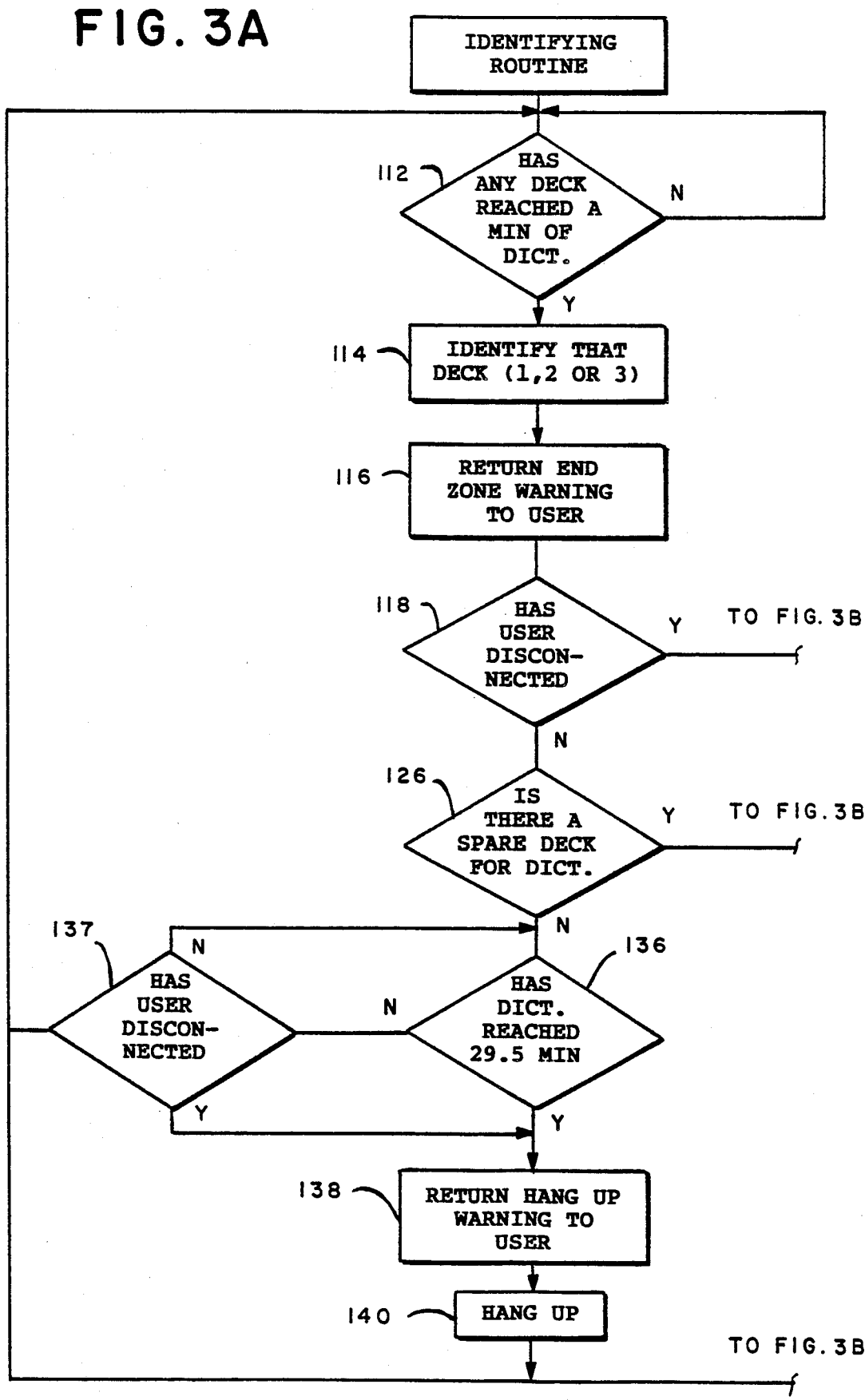
FIGS. 3A and 3B is a flow diagram representing one aspect of the present invention.
Figure 3B:
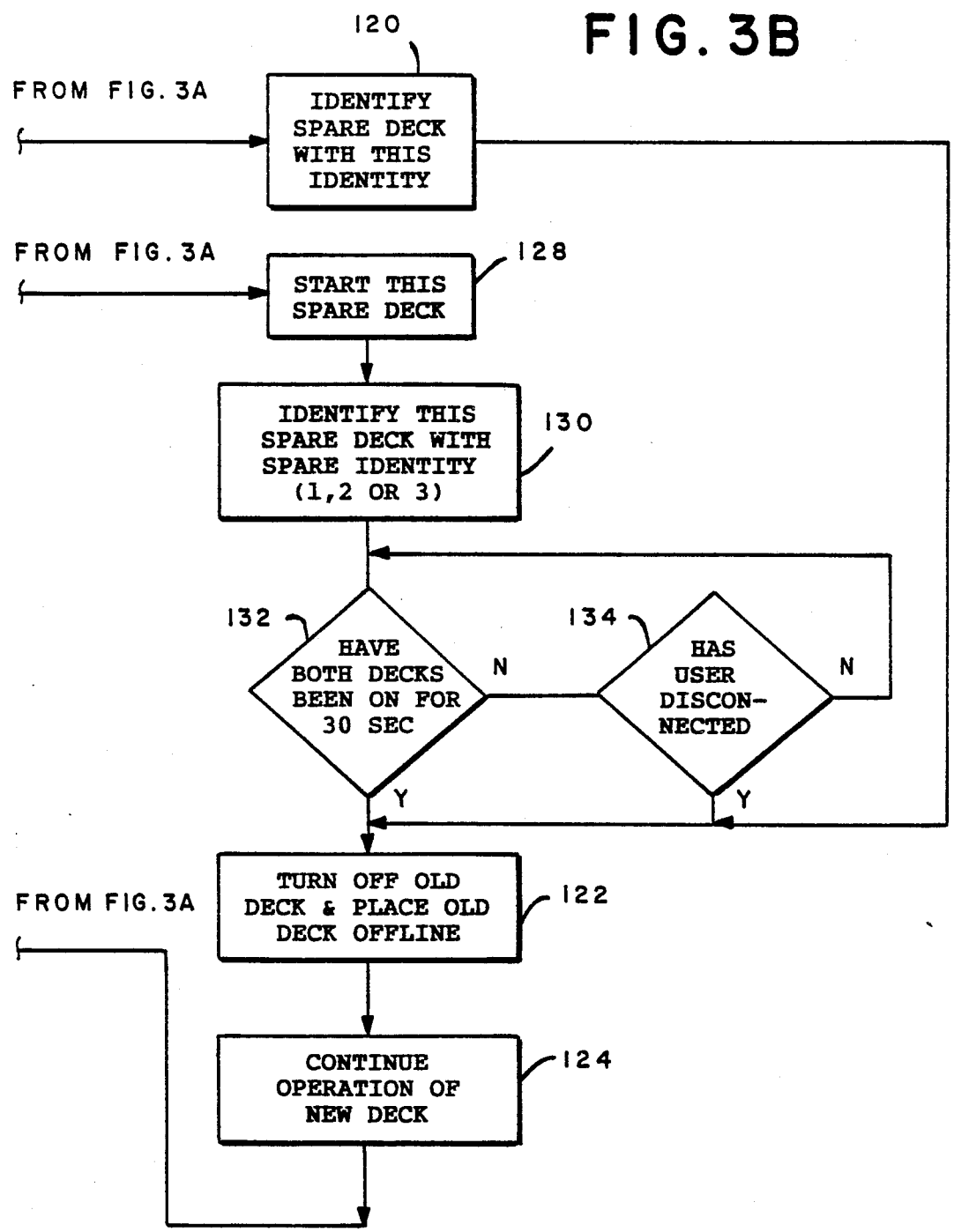

Upon entering the routine illustrated in FIG. 3, inquiry first is made at 112 as to whether any of the recording units which are operating as dictation units has a predetermined amount of dictation recorded thereon. Assuming such recording units are identified as units "1", "2" and "3", and further assuming that each recording unit is adapted to record up to thirty minutes of dictation, inquiry 112 inquires as to whether unit "1" or unit "2" or unit "3" has twenty-seven minutes of dictation recorded thereon. As mentioned above, as dictation on a magnetic tape proceeds, chopper pulses are generated as the tape is transported. Such chopper pulses are counted, and a predetermined count is obtained when a length of tape corresponding to the recording of twenty-seven minutes of dictation has been transported. The state of such a chopper pulse counter is examined by inquiry 112. If this inquiry is answered in the negative, the routine cycles, as illustrated, until this inquiry is answered in the affirmative. At that time, instruction 114 is carried out and the particular unit which has reached twenty-seven minutes of dictation is identified. That is, the unit is identified as unit "1" or unit "2" or unit "3", depending upon the particular identity thereof.

The routine then advances to instruction 116, whereupon an end zone warning signal, e.g. a suitable warning tone, is generated and transmitted back to the dictate station then connected to the identified unit. Inquiry 118 then is made to determine if this dictate station has disconnected from the identified unit. If inquiry 118 is answered in the affirmative, the "spare" unit is identified, at 120, with the very same identity as the unit which has just reached its "end zone". That is, the identity determined by instruction 114 is transferred, at 120, to the "spare" unit. The routine then advances to instruction 122, whereupon the previously identified unit is turned off and is rendered "off line". Then, as represented by instruction 124, the newly identified unit is conditioned for subsequent or continued operation with its new identity. That is, the "spare" unit now is identified as unit "1" or "2" or "3", depending upon the identity that has been determined at instruction 114. The routine ultimately returns to inquiry 112.

If inquiry 118 is answered in the negative, that is, if after reaching the "end zone" of a cassette, dictate station 80 remains connected to the identified recording unit, inquiry is made at 126 to ascertain if a "spare" deck is provided for operation as a dictation unit. If this inquiry is answered in the affirmative, instruction 128 is carried out to initiate the operation of this "spare" unit. Then, as represented by instruction 130, this "spare" unit is identified with the same identity (i.e. as unit "1" or "2" or "3") as has been identified at instruction 114. That is, the "spare" unit is designated with the same identity as the particular recording unit which has just reached its "end zone".

It is appreciated that, by reason of instructions 128 and 130, the recording unit which has just reached its "end zone" and the newly identified "spare" unit operate simultaneously and both record dictation that is transmitted from the dictate station that had been connected to the unit identified by instruction 114. Inquiry is made at 132 to determine if both units had been operated simultaneously for a predetermined amount of time (e.g. for thirty seconds). If this inquiry is answered in the negative, inquiry then is made at 134 to ascertain if the dictate station has been disconnected from these recording units. If inquiry 134 is answered in the negative, the illustrated routine cycles through inquiries 132 and 134 until one of them is answered in the affirmative. At that time, the routine advances to instruction 122, which has been discussed above. Thus, if the dictate station has disconnected from both units before they operate simultaneously for a thirty second period, or if the dictate station remains connected to both units for this thirty second period, the unit which has just reached its end zone is turned off and placed in an "off line" mode. Then, if the dictate station remains connected to the "spare" unit with its newly designated identity, the dictator may continue with his dictation on the newly identified unit, as represented by instruction 124.

Let it be assumed that a "spare" unit is not available for dictation. For example, if the "spare" unit had been assigned a newly designated identity previously, or if the "spare" unit has been selected for operation as a transcription unit, or if the "spare" unit is "off line", inquiry 126 is answered in the negative. Then, although the unit identified by instruction 114 has reached its "end zone", dictation thereon may continue. Inquiry is made, at 136, if this continued dictation has reached the 29.5 minute mark. If this inquiry is answered in the negative, the illustrated routine cycles through this inquiry until either the dictate station disconnects from this unit, as ascertained by inquiry 137, or until dictation thereon reaches the 29.5 minute mark. At that time, a hang-up, or disconnect, warning signal is generated and transmitted to the dictate station connected to this unit, as represented by instruction 138, and the connection between that dictate station and this unit is broken, as represented by the instruction "hang up" at 140. The illustrated routine eventually returns to inquiry 112.

It will be appreciated that, if desired, the particular numerical examples set out in, for instance, inquiries 112, 132 and 136 may be varied, as desired. That is, the "end zone" region may be established as less than or greater than twenty-seven minutes of dictation; the period for simultaneous recording on two units may be less than or greater than thirty seconds and the time at which the dictate station is disconnected from the recording unit may be any desired time after the "end zone" is reached.

The manner in which the microprocessor included in dictation system 10 (for example) operates to select recording unit 12 or 14 for operation as a dictation unit or a transcription unit, or for both recording units to operate as dictation units now will be described in conjunction with the microprocessor routine illustrated by the flow diagram shown in FIG. 4. This flow diagram also represents the manner in which the respective recording units 12, 14, 12' and 14' are identified as units "1", "2", "3" and "spare" to facilitate the operation represented by the just-described flow diagram shown in FIG. 3.

Figure 4B:
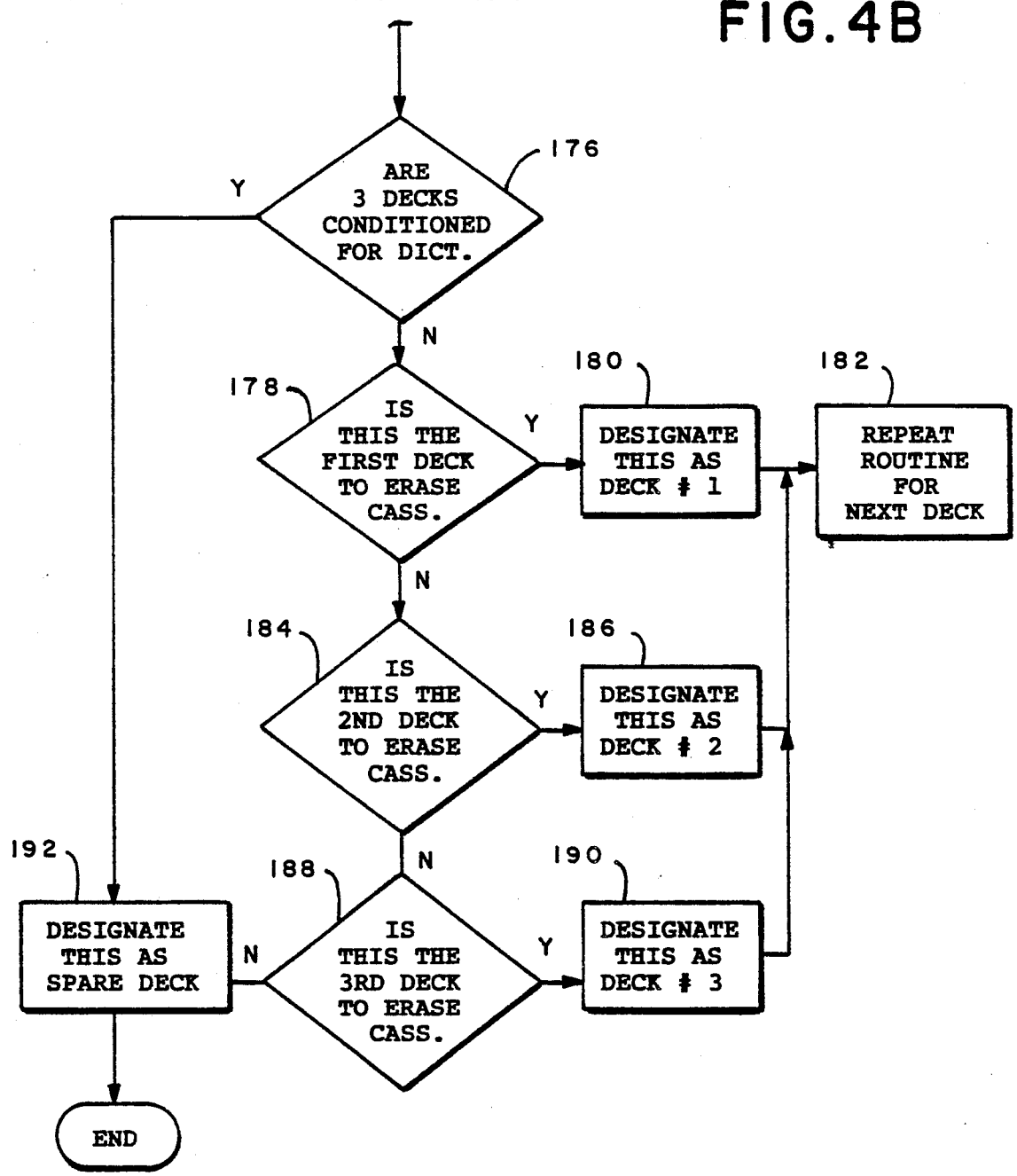

Turning now to the routine illustrated in FIG. 4, let it be assumed that unit selector switch 42 exhibits its first condition to select recording unit 12 for keyboard operation. Inquiry 152 first is made as to whether a cassette has been loaded into this recording unit. As is conventional, the recording unit may include a sensor switch that detects the presence of a cassette loaded therein. If this switch is actuated, inquiry 152 is answered in the affirmative. However, if a cassette has not been loaded into recording unit 12, this inquiry is answered in the negative. Thereupon, displays 24, 25 and 26 are blanked, as represented by instruction 154, and the illustrated routine cycles through inquiry 152 and instruction 154 until the presence of a cassette is detected.

When a loaded cassette is sensed in the recording unit selected by selector switch 42, inquiry 152 is answered in the affirmative and inquiry is made, at 156, to ascertain if this recording unit has been selected to operate as a transcription unit. If unit selector switch 42 exhibits its first condition, then recording unit 12 is selected for operation as a transcription unit. Conversely, if unit selector switch 42 exhibits its second condition, then recording unit 14 is selected for operation as the transcription unit. Assuming that inquiry 156 is directed to recording unit 12, and further assuming that unit selector switch 42 exhibits its first condition, this inquiry is answered in the affirmative. Accordingly, mode display 25 is energized to indicate that recording unit 12 has been selected for operation as the transcription unit, for example, the character "T" is displayed; the "in use" indicator of operation display 24 is energized; and any attempt to connect a dictate station to recording unit 12 is met by a "busy" signal which apprises the dictator that this recording unit is in use and cannot be accessed by him for dictation. In addition, the indicator associated with unit selector switch 90-1 at all of dictate stations 80 is energized to provide a visual indication to each dictator that this unit is "busy".

Thereafter, and as represented by instruction 160, recording unit 12 is conditioned for transcription such that the foot pedal (not shown) and headset 100 connected to dictation system 10 may be operated to transcribe dictation that is recorded on the cassette included in recording unit 12.

The illustrated routine then is repeated, as represented by instruction 162, for recording unit 14. That is, inquiries 152 and 156 as well as instructions 158 and 160 are carried out to determine if a cassette is loaded into recording unit 14, if this recording unit has been selected by unit selector switch 42 for a transcription operation, and to provide a visual display of such a selection, prevent a dictator from accessing this unit and condition this unit for transcribing dictation that has been recorded on the cassette therein.

Let it be assumed that inquiry 156 is answered in the negative. That is, it is assumed that a cassette is loaded into recording unit 12 (as an example, reference is made to recording unit 12), but that unit selector switch 42 does not exhibit its first condition. The unit selector switch may exhibit either its second condition, whereby recording unit 14 is selected for use as a transcription unit, or the selector switch may exhibit its third or "off" condition, which selects neither recording unit for a transcription operation.

If inquiry 156 is answered in the negative, inquiry next is made, at 164, to ascertain if the cassette which has been loaded into recording unit 12 has been erased. This inquiry is answered in the affirmative if ERASE switch 62 and REWIND switch 56 had been operated simultaneously and the cassette of recording unit 12 had been fully rewound (while being erased). It is recalled that such an erase operation cannot be carried out unless unit selector switch 42 exhibits its first condition to permit basic operations (i.e. operations triggered by the function control switches of dictation system 10) of recording unit 12. Thus, for inquiry 164 to be answered in the affirmative, unit selector switch 42 would have had to exhibit its first condition, the cassette loaded into recording unit 12 would had to have been erased and then the condition of the unit selector switch would had to have been changed from its first condition.

A positive answer to inquiry 164 leads to inquiry 168 to ascertain if unit selector switch 42 exhibits its third, or "off" condition. It is appreciated that when inquiry 168 is made, this unit selector switch may exhibit either its second or its third condition. If this inquiry is answered in the affirmative, recording unit 12 is conditioned for dictation and mode display 25 is energized to provide a suitable visual indication, for example, the character "D" is displayed. Recording unit 12 then may be connected to any dictate station to record dictation therefrom. Thereafter, inquiry is made, at 174, to determine if more than two recording units are included in the dictation system. For example, this inquiry is answered in the affirmative in the event that the embodiment shown in FIG. 2 is present. However, assuming that the simple 2-unit configuration shown in FIG. 1 is being utilized, inquiry 174 is answered in the negative and, as represented by instruction 162, the aforedescribed routine is repeated for recording unit 14.

If the cassette loaded into recording unit 12 had not been erased, but unit selector switch 42 exhibits its second or third condition, inquiries 156 and 164 both are answered in the negative. Then, as represented by instruction 166, mode display 25 is energized to indicate the "off line" display. In addition, recording unit 12 is inhibited from being connected to dictate stations. An attempt to access this recording unit is met by a "busy" indication; and the visual indicator associated with unit selector switch 90-1 at each dictate station 80 is energized to indicate that recording unit 12 is not accessible for dictation. The routine then is repeated for recording unit 14, as represented by instruction 162.

If the cassette loaded into recording unit 12 had been erased and if unit selector switch 42 had been changed over from its first condition (to enable erasure of the cassette) to its second condition, inquiry 156 is answered in the negative, inquiry 164 is answered in the affirmative and inquiry 168 is answered in the negative. Consequently, and as represented by instruction 170, mode display 25 is blanked. Moreover, recording unit 12 is not made available, at this time, for access by a dictate station.

The foregoing routine then is repeated for recording unit 14.

Thus, it should be appreciated that both recording units may be conditioned for dictation, or one may be conditioned for dictation while the other is conditioned for transcription. For example, after the cassette loaded into recording unit 12 is erased, unit selector switch 42 may be changed over to its second condition, resulting in inquiry 156 being answered in the negative, inquiry 164 being answered in the affirmative and inquiry 168 being answered in the negative. Then, when the illustrated routine is executed for recording unit 14, if the cassette loaded into this recording unit is erased and then unit selector switch 42 is changed over to its third, or "off" condition, inquiry 156 is answered in the negative and inquiries 164 and 168 both are answered in the affirmative. Subsequently, when this routine is carried out once again for recording unit 12, inquiry 156 is answered in the negative and inquiries 164 and 168 both are answered in the affirmative. As a result, both recording unit 12 and recording unit 14 are conditioned for dictation, as represented by instruction 172, and both recording units may be accessed by respective dictate stations.

When selecting one recording unit for dictation and the other for transcription, the unit which is to operate as a dictation unit should be selected first. Then, once this unit is conditioned for dictation and mode display 25 is energized to indicate the character "D", as described above, the other unit may be conditioned for transcription. For example, if recording unit 12 is conditioned for dictation, the character "D" remains displayed and the unit may be accessed by a dictate station until unit selector switch 42 is operated to its first condition. At that time, inquiry 156 is answered in the affirmative and the character "T" is displayed by mode display 25.

The routine represented by the inquiries and instructions extending between inquiry 152 and inquiry 174 comprises an initializing routine by which the respective recording units 12 and 14 are initialized for operation as dictation or transcription units. A similar initializing routine is carried out for each recording unit included in, for example, the 4-unit configuration shown in FIG. 2. Let it be assumed that three or more recording units (e.g. the 4-unit configuration shown in FIG. 2) are present in the dictation system. Let it be further assumed that one of these four recording units has been conditioned for dictation in the manner described above. Inquiry 174 then is answered in the affirmative, and inquiry next is made, at 176, to ascertain if three of the recording units in the system already had been conditioned for dictation. If this inquiry is answered in the affirmative, the initializing routine advances to instruction 192, whereupon the recording unit then being processed is designated the "spare" unit. Thus, all four recording units have been identified, and the microprocessor advances to another routine.

However, if inquiry 176 is answered in the negative, inquiry next is made, at 178, to determine if this recording unit is the first unit in which the cassette has been erased. If so, inquiry 178 is answered in the affirmative and the initializing routine advances to instruction 180 whereupon this recording unit is identified as unit "1". Then, the initializing routine is repeated for the next recording unit.

If inquiry 178 is answered in the negative, that is, if the cassette in this recording unit is not the first to have been erased, inquiry next is made at 184 to determine if this cassette is the second cassette to be erased. If so, the initializing routine advances to instruction 186 and the recording unit in which this cassette is located is identified as unit "2". The foregoing initializing routine then is repeated.

If the cassette included in the recording unit under examination is neither the first nor the second cassette to have been erased, inquiries 178 and 184 both are answered in the negative and inquiry is made, at 188, to ascertain if this cassette is the third cassette to have been erased. If so, the initializing routine advances to instruction 190 whereupon this recording unit is identified as unit "3". The foregoing routine then is repeated for the last of the recording units. However, if inquiry 188 is answered in the negative, then this recording unit is designated the "spare" unit, as represented by instruction 192.

Thus, it is seen that the identities of the respective recording units are designated in the same order (i.e. "1", "2", "3" and "spare") as the cassettes therein are erased. The order of erasure preferably is established by the order in which a cassette is fully erased. For example, the erasure of a cassette included in recording unit 12 may be initiated before the erasure of a cassette included in recording unit 14', but the cassette in recording 14' may be rewound to its beginning prior to the complete rewinding of the cassette included in recording unit 12. As a result, the identity of recording unit 14' may be designated with a higher order than the identity of recording unit 12. That is, recording unit 14' may be designated as unit "1" while recording unit 12 may be designated as unit "2"; or recording unit 14' may be designated as unit "2" while recording unit 12 is designated as unit "3"; or recording unit 14' may be designated as unit "3" while recording unit 12 may be designated as the "spare" unit.

It will be appreciated that the identities which are established by the initializing routine shown in FIG. 4 are utilized by the routine illustrated in FIG. 3.

While the present invention has been particularly shown and described with reference to certain preferred embodiments, it will be appreciated that various changes and modifications may be made without departing from the spirit and scope of the invention. Some of these changes and modifications have been mentioned above. Others will be apparent to those of ordinary skill in the art. For example, in place of the illustrated dictate station 80, a microphone having function control switches thereon, such as illustrated in U.S. Pat. No. 4,378,577, may be used. Also, the record medium need not be limited solely to a cassette. Other record media, including the aforementioned solid-state digital storage devices, are contemplated. Also, the unit selector switch need not be limited solely to a 3-position switch, as represented by switch 42. A respective selector switch associated with each recording unit may be utilized, if desired, that selector switch serving to select the recording unit for operation as a dictation unit or as a transcription unit. It will be recognized that modifications in the flow diagrams illustrated in FIGS. 3 and 4 may be made in order to accommodate and be compatible with changes that may be adopted for the dictation system. Furthermore, although not illustrated in FIG. 4, the conditioning of recording unit 12 or recording unit 14 for operation as a dictation or transcription unit may, if desired, require the actuation of CLEAR switch 64.

It is intended that the appended claims be interpreted as including the foregoing as well as other changes and modifications.

What is claimed is:

1. A dictation system comprising:
   at least three recording units, each operable in response to dictate control signals to record dictation transmitted thereto;
   means for identifying each of said at least three recording units with a respective, particular identity,
   at least one dictate station for providing dictated messages and dictate control signals;
   switch means for connecting said at least one dictate station to a desired recording unit having a selected identity;
   sense means for sensing when a predetermined amount of dictation has been recorded on one of said recording units;
   change-over means responsive to said sense means for changing the identity of a preselected recording unit to be equal to the identity of said one of said recording units, whereby whenever any dictate station is to be connected thereafter to the recording unit having said selected identity, said preselected recording unit is connected to that dictate station by said switch means; and
   detecting means for detecting continued dictation transmitted to said one recording unit after said predetermined amount of dictation has been recorded thereon; conditioning means for conditioning said preselected recording unit for recording the continued dictation such that said one recording unit and said preselected recording unit record dictation simultaneously; and inhibit means for inhibiting a further recording operation of said one recording unit after a predetermined time period of simultaneous recording.

2. The system of claim 1 wherein said at least three recording units are identified as at least first, second and spare recording units; and wherein said change-over means changes the identity of said spare recording unit to said first or second recording unit dependent upon which of said first and second recording units has said predetermined amount of dictation recorded thereon.

3. The system of claim 1 wherein four recording units are provided, said four recording units being identified as first, second, third and spare recording units; and wherein said change-over means changes the identity of said spare recording unit to said first or second or third recording unit, dependent upon which of said first, second and third recording units has said predetermined amount of dictation recorded thereon.

4. The system of claim 1 further comprising means responsive to a disconnection of said dictate station from said one recording unit by said switch means prior to the expiration of said predetermined time period of simultaneous recording for operating said inhibit means to inhibit said one recording unit from subsequent recording.

5. The system of claim 1 further comprising means responsive to a disconnection of said dictate station from said one recording unit after said predetermined amount of dictation has been recorded for conditioning said preselected unit for subsequent recording.

6. A dictation system, comprising:
   at least three recording units, each being operable to record dictation on a record medium therein;
   initializing switch means operable to bring the record medium in a selected recording unit to an initial condition for subsequent recording;
   selector switch means for selecting a respective recording unit for initializing the record medium therein;
   identifying means for detecting the order in which the record media at said recording units are initialized and for designating said recording units with respective, particular identities representing the order in which said record media are initialized;
   sense means for sensing when a predetermined amount of dictation has been recorded on one of said at least three recording units; and
   change-over means responsive to said sense means for changing the identity of a preselected recording unit to be equal to the identity of said one recording unit, whereby the changed over recording unit is operable to record dictation destined for recording on a recording unit having the identity of said one recording unit.

7. The system of claim 6 comprising four recording units arranged in two pairs; wherein said selector switch means comprises two selector switches, each connected to a respective pair of recording units and each having first and second conditions to select first and second recording units, respectively, in said respective pair; and wherein said initializing switch means comprises initializing switch devices, each connected to a respective pair of recording units and each being operable to initialize the recording medium in the recording unit of the respective pair that has been selected by the selector switch connected to that pair.

8. The system of claim 7 wherein each said initializing switch device comprises erase switch means operable to erase information from the record medium in the recording unit selected by the respective selector switch.

9. The system of claim 7 wherein each said selector switch additionally has a third condition; and wherein said identifying means comprises means responsive to a change in the condition of a respective selector switch from the first or second condition thereof to said third condition for designating the first or second recording unit, respectively, in a pair with a particular identity depending upon the order in which the respective selector switches are operated.

10. A method of controlling the connections of respective ones of plural recording units to dictate stations in a dictation system, some of said recording units being designated with predetermined identities and at least one recording unit being designated a spare unit, said method comprising the steps of:

sensing when a predetermined amount of dictation has been recorded by a recording unit of particular identity which is connected to a dictate station;

designating the spare recording unit with the same particular identity as that of the connected recording unit:

connecting the recording unit with the newly designated identity to a dictate station in place of said connected recording unit when a connection is intended to be made from a dictate station to said recording unit having said particular identity; and wherein both said spare recording unit and said connected recording unit having said particular identity are operated simultaneously to record dictation; and said connected recording unit having said particular identity is rendered inoperative to record further dictation after said dictate station is disconnected therefrom.

11. The method of claim 10 in which said spare recording unit is designated with said particular identity when said dictate station is disconnected from said recording unit on which said predetermined amount of dictation has been recorded.

12. The method of claim 10 wherein said connected recording unit having said particular identity is disconnected from said dictate station a predetermined time after it and said spare recording unit are operated simultaneously to record dictation.

13. The method of claim 12 wherein said spare recording unit having the newly designated identity continues to record dictation from said dictate station until said dictate station is disconnected therefrom.

14. The method of claim 10 wherein the identities of the recording units are designated by initializing each unit for the recording of dictation, detecting the order in which the recording units are initialized, and designating the recording units with respective identities in accordance with the order in which they are initialized.

15. The method of claim 14 wherein said recording unit records dictation on a record medium, and each recording unit is initialized by erasing previously recorded dictation from the record medium therein.

16. A dictation system comprising:
at least three recording units, each operable in response to dictate control signals to record dictation transmitted thereto;
at least one dictate station operable by a user for providing dictated message and dictate control signals;
switch means operable by the user for connecting said at least one dictate station to one of said recording units selected by that user;
sense means for sensing when a predetermined amount of dictation has been recorded on said one recording units;
change-over means responsive to said sense means for changing the recording unit to which said at least one dictate station is connected from said one recording unit to a preselected recording unit, whereby said preselected recording unit thereafter is connected by said switch means to a dictate station to receive dictation destined by a user for said selected one recording unit;
detecting means for detecting continued dictation transmitted to said one recording unit after said predetermined amount of dictation has been recorded thereon;
conditioning means for conditioning said preselected recording unit for recording the continued dictation such that said one recording unit and said preselected recording unit record dictation simultaneously;
inhibit means for inhibiting a further recording operation of said one recording unit after a predetermined time period of simultaneous recording.

17. The system of claim 16 wherein said at least three recording units include first, second and spare recording units; and wherein said change-over means operates to substitute said spare recording unit for said first or second recording unit dependent upon which of said first and second recording units has said predetermined amount of dictation recorded thereon.

18. The system of claim 16 further comprising means responsive to a disconnection of said dictate station from said selected one recording unit after said predetermined amount of dictation has been recorded for conditioning said preselected unit for subsequent recording.

19. A dictate/transcribe system comprising:
first and second recording units, each being operable as a dictation unit or a transcription unit;
selector switch means for selecting one of said first and second recording units to operate as a transcription unit and the other to operate as a dictation unit or to select both recording units to operate as dictation units;
medium sense means for sensing the presence of a record medium ready for recording in the respective recording units;
dictate enabling means for enabling a recording unit to record dictation if a record medium ready for recording is present therein and that recording unit has been selected for operation as a dictation unit;
transcribe enabling means for enabling a recording unit to transcribe dictation if a record medium is present therein and that recording unit has been selected for operation as a transcription unit;
inhibit means for inhibiting a recording unit from recording or transcribing dictation if a record medium is present therein but has not been initialized for recording;
wherein said selector switch means includes a first condition for selecting said first recording unit to operate as a transcription unit, a second condition for selecting said second recording unit to operate as a transcription unit, and a third condition for selecting whichever recording unit has a record medium ready for recording to operate as a dictation unit;
said system further comprising:
erase means for erasing information from a record medium present in the recording unit selected by said selector switch means, and erase switch means for triggering said erase means and thereby make said record medium in said selected recording unit ready for recording; and
said system further comprising:
third and fourth recording units;
means for detecting when three of said recording units are enabled to record dictation, said selector switch means being additionally operative for selecting the third or fourth recording units to operate as a transcription unit;
means responsive to said erase means when said selector switch means selects said third or fourth recording unit for enabling that recording unit to operate as a dictation units; and, identifying means for identifying the numerical order in which information is erased from the record media present in respective recording units and for designating corresponding identities of said recording units.

20. A method of controlling recording on and transcription from at least two recording units in a dictation system, comprising the steps of:

selecting one of said two recording units for a transcription operation;

sensing which of said recording units has been selected for a transcription operation;

inhibiting the recording unit selected for a transcription operation from recording dictation;

detecting if the other of said recording units has been conditioned for a recording dictation; and enabling said other recording unit to record dictation if said other recording unit is conditioned therefor;

wherein a recording unit is conditioned of recording dictation if previously recorded dictation has been erased therefrom; and, wherein said dictation system includes at least one selector switch having two conditions to select one or the other recording unit, respectively, for a transcription operation and a third condition; and wherein previously recorded dictation is erased from the recording unit selected by said selector switch; and, wherein said one recording unit is enabled to record dictation if previously recorded dictation is erased therefrom and said selector switch is changed over from said first condition to said third condition; and said other recording unit is enabled to record dictation if previously recorded dictation is erased therefrom and said selector switch is changed over from said second condition to said third condition.

21. The method of claim 20 further comprising the step of detecting the condition of said selector switch.

22. The method of claim 21 further comprising the step of displaying which recording unit is enabled to record dictation and which recording unit is selected for a transcription operation.

23. The method of claim 21 further comprising the step of displaying that a recording unit is in use either when that unit has been selected for a transcription operation or when dictation is being recorded thereon.

24. The method of claim 21 further comprising the steps of connecting a dictate station in said dictation system to a recording unit that is enabled to record dictation; and inhibiting a dictate station from being connected to a recording unit that is not enabled to record dictation.

* * * * *